E. A. SCHADE.
BENCH DOG.
APPLICATION FILED AUG. 12, 1908.
941,816.
Patented Nov. 30, 1909.
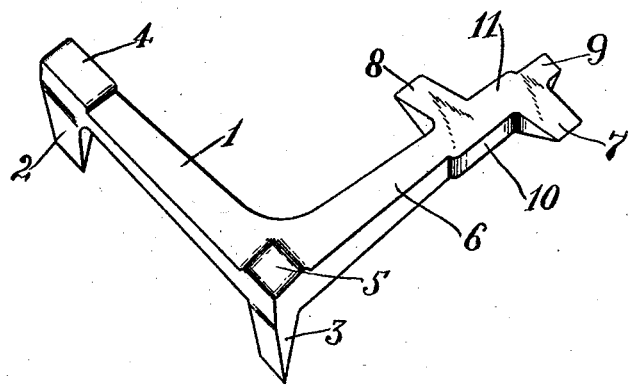
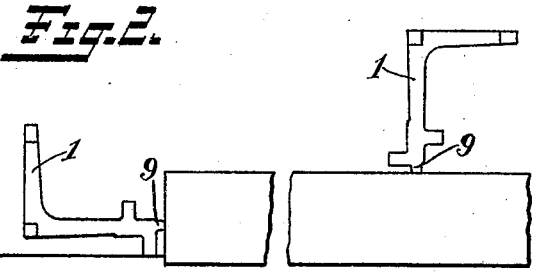
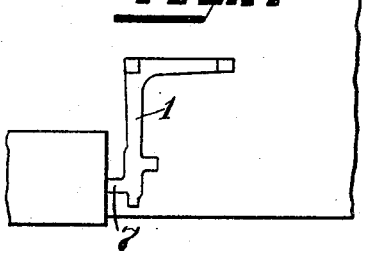
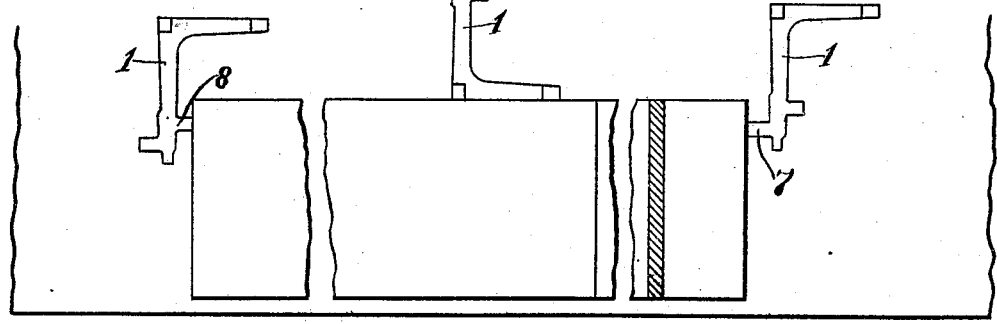
Witnesses:
Fred. M. Dannenfelser.
Chas. A. Peard.
Inventor
E. A. Schade.
By his Attorneys.

UNITED STATES PATENT OFFICE.

EDMUND A. SCHADE, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

BENCH-DOG.

941,816.  Specification of Letters Patent.  Patented Nov. 30, 1909.

Application filed August 12, 1908. Serial No. 448,101.

*To all whom it may concern:*

Be it known that I, EDMUND A. SCHADE, a citizen of the United States, residing at New Britain, county of Hartford, State of Connecticut, have invented certain new and useful Improvements in Bench-Dogs, of which the following is a full, clear, and exact description.

My invention relates to improvements in carpenter's bench dogs, which are designed to be used to hold the stock operated upon conveniently and rigidly during the operations of planing, sawing, dado cutting and the like.

The object of the invention is to provide a bench dog having its parts so constructed and arranged that it may be used in a great variety of positions for holding the stock.

The preferred form of my invention is shown in the accompanying drawings, in which, Figure 1 is a perspective view of the bench dog. Figs. 2, 3 and 4 represent the bench dog engaging the stock in different positions for planing, and Figs. 5, 6 and 7 represent the bench dog in various positions for producing a saw or dado cut in the stock.

In the embodiment of my invention herein selected for illustration the same consists of a body portion 1, preferably of right angled construction, one of the arms thereof being provided at its extremity with a driving or holding prong 2 and a second holding prong 3 is provided at the angle of the body portion. Above the prongs 2 and 3 and on the opposite side of the arms to which they are attached I provide the raised or reinforced driving surfaces 4—5, respectively, which are adapted to reinforce these portions of the body against the blows of the hammer in driving the holding prongs into the carpenter's bench. Upon the other arm 6 of the body portion I provide a plurality of stock engaging wedges 7, 8 and 9, respectively, the wedges being respectively on the outer and inner sides of the arm 6 and the wedge 9 being on the extremity of and in line with said arm, and opposite the wedges 7 and 8 are provided the driving surfaces 10 and 11. The form of the bench dog and number and arrangement of the stock engaging wedges renders it possible to use the dog in a large variety of positions in connection with the stock to hold the same firmly and conveniently for the various operations thereon.

In Fig. 2 the bench dog is shown having its end wedge 9 engaging the stock, the driving prongs 2 and 3 being embedded in the bench. In this position the dog forms a secure stop for the stock against the planing operation.

In Fig. 3 the dog is shown in position to back up the stock while being planed.

Fig. 4 shows the dog in position to hold the stock against backward drawing during the planing operation. Thus it will be seen that the dog is adapted to hold the stock against any possible movement due to the planing operation.

Fig. 5 shows the dog in position to hold the stock firmly for sawing, in which position it is preferable to use the same in conjunction with a dog at the opposite end of the stock, as shown in Fig. 7, whereby the stock is securely held throughout its length during the sawing operation.

Fig. 6 shows a position of the dog to back up the stock while being sawed or otherwise transversely cut.

What I claim is:

1. A bench dog comprising arms arranged at an angle to each other, a plurality of holding prongs attached thereto, and a plurality of stock holding wedges on one of said arms, including a wedge at the extremity thereof.

2. A bench dog comprising arms arranged at an angle to each other, a plurality of holding prongs formed upon one arm thereof and a plurality of stock holding wedges formed upon the extremity of the other arm and comprising a wedge located in line with said arm, a wedge on the inner side and a wedge on the outer side of said arm.

3. A bench dog comprising arms arranged at an angle to each other, a holding prong near the extremity of one arm thereof, a second holding prong at the junction of said arms and a plurality of stock holding wedges formed upon the other arm thereof comprising a wedge located in line with said arm, a wedge on the inner side and a wedge on the outer side of said arm and raised driving abutments formed upon the body portion opposite said holding prongs.

4. A bench dog comprising arms arranged at an angle to each other, a plurality of holding prongs attached thereto and a plurality of stock holding wedges on one of said arms including a wedge on the inner side and a wedge on the outer side thereof.

EDMUND A. SCHADE.

Witnesses:
W. J. WORAM,
E. G. HOFFMAN.